United States Patent Office 3,606,428
Patented Sept. 20, 1971

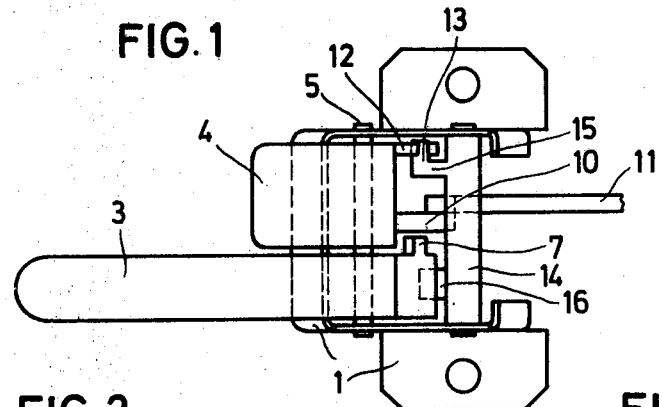
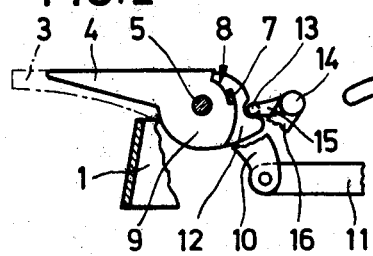
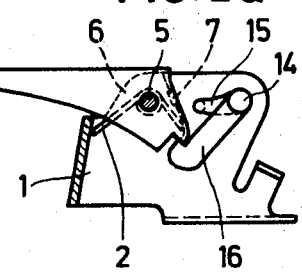
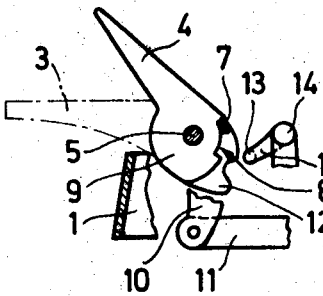
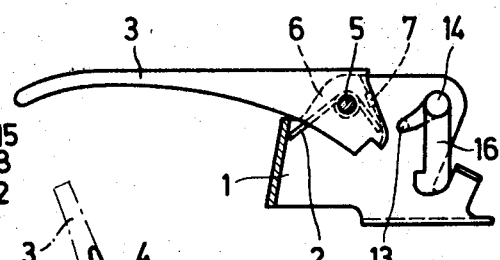
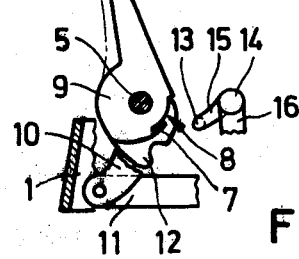

3,606,428
SAFETY DEVICE FOR MOTOR VEHICLE DOOR LOCKS
Karl Erck and Gunter Rafelt, Wolfsburg, Germany, assignors to Volkswagenwerk Aktiengesellschaft, Wolfsburg, Germany
Filed July 9, 1969, Ser. No. 840,278
Claims priority, application Germany, July 9, 1968, P 17 03 776.2
Int. Cl. E05b 3/00; E05c 1/04
U.S. Cl. 292—336.3                5 Claims

ABSTRACT OF THE DISCLOSURE

A safety device for the door locks of motor vehicles having an inside operating lever with a safety button mounted adjacent and together with the operating lever and with the operating rod and coupling means for the safety button with an intermediate shaft which extends behind the operating lever.

---

This invention relates to a safety device for the door locks of motor vehicles with a push button for safety which is swivelable and mounted on an axis, side by side with the inside operating lever and with an operating rod.

In the case of a known device of this type, the operating rod has been articulated to an angle bracket of the operating lever by means of an oblong hole. Safety or locking is accomplished by pressing down the safety push button into the plane of the operating lever whereby a lever of the push button deflects the operating rod in the oblong hole up to the stop. In this position it is true that the door is secured against opening from the outside but from the inside, on the other hand, the safety is ineffective since the push button does not prevent the operating lever from being pulled up and thus the release and the unlocking of the lock. Rather, the push button is moved during this procedure by the end of the operating rod.

The generally known push buttons at the rear end of the window frame which secure the lock when they are pushed down both from the inside as well as from the outside, and which release the lock when they are pulled up, can be reached only with difficulty from the driver's seat. Besides, there the danger exists that children sitting in the back seat are able to release the lock without being noticed by the driver.

In order to avoid these disadvantages, it is an object of the invention to provide for a safety arrangement of the type mentioned in which the safety push button is coupled with the operating rod and intermediate shaft which reaches with a hook-like lever in the closing position of the safety button behind the rear end of the operating lever. According to this structure the operating elements for the inside and outside of the lock and for the opening of the door from the inside are in the same place, and as a result thereof, the operation of the lock from the front seats is not only simpler and easier but also safer since the safety button is arranged at a place that is inaccessible to children sitting in the rear. In the locking position of the safety button, the hook blocks the operating lever so that an opening of the lock is not possible if the safety button has previously been placed high and thus the operating rod coupled with it is shifted, that is to say, when the lock is released. For practical purposes, the safety button will be mounted loosely for this purpose on its axis and is coupled with the operating lever with interposition of a backlash which corresponds to the shifting path of the operating rod required for the locking or release of the lock. At the same time, the backlash is fixed by a driver arranged on the hub of the operating lever which engages with a segment-like recess on the hub of the safety button.

For the coupling of the safety button with the intermediate shaft, the latter advantageously will have a crank that engages by means of a peg with a fork of the safety button and which emerges gradually during the swiveling from the fork. The safety button therefore is not constantly coupled with the intermediate shaft, and thus the area covered by the hook is small.

Further objects of the invention will be apparent from the following description when considered in connection with the accompanying drawing in which;

FIG. 1 is a top plan view of the door latch,
FIGS. 2 and 2a are side views partly in section of the safety latch,
FIGS. 3 and 3a are side views partly in section of the latch in different positions, and
FIG. 4 is a side view of the latch in open position.

In a frame 1, an operating lever 3 is swingable under the force of a spring 2 and a loosely rotatable safety lever 4 is mounted adjacent the lever 3 on a pin or rod 5. In the locked position, the operating lever 3 and the safety lever 4 are in the same plane whereby in this position there is provided for the safety lever 4, a projection or driver 7 at the hub 6 of the operating lever 3, against which an end of an elongated segmental depressed part 8 lies, in the hub 9 of the safety lever 4.

The lever 4 has an angular arm 10, to which the securing or mounting rod 11 is linked and a projection or fork 12 grips a pin 13 on a shaft 14 of a crank member 15. The main or applied shaft 14 is provided with a hook-shaped lever 16 which is the base position or neutral setting of the latch, the back end of the operating lever 3 will grip at the back so that this will act as a block or catch. At the same time, the lock will be at safety (FIGS. 2 and 2a) relative to the operating or connecting rod 11.

The safety key or lever 4 has a neutral condition or action which is only dependent on the length of the slot or cutout portion 8. While the safety key or lever 4 is swung into the neutral position until the other end of the portion 8 is against the projection 7, FIG. 3, the lock will be in a nonsafety state and at the same time the shaft 14 will be rotated as to the fork 12 and the crank 15 so that the lever 16 will be freed from the action or connection of the operating lever 3, FIG. 3a. When the lever 3 is pulled up, FIG. 4, the neutral position will be passed over until the projection 7 will be positioned or will reach the other end of the slot or guide 8. Upon further rotation, the operating lever 3 will take along the projection 7 and the safety lever 4 and thus also the rod 11, whereby the lock will be opened and the door can be opened.

Upon slamming the door shut, the safety lever 4 will be subjected to function therewith. If now the lever 4 is pressed downward, the lock will be again made safe and the operating lever 3 will be blocked by the means of the lever 16.

We claim:
1. Safety device for the door locks of motor vehicles comprising an inside operating lever with an operating rod, a swivelable safety button mounted on an axis side by side and together with the inside operating lever and coupling means for coupling the safety button with the operating rod and with an intermediate shaft provided rearwardly of the operating lever to cooperate with a hook-shaped lever, and when the safety button is in a closed position, said hook-shaped lever engages the operating lever to act as a block for the operating lever.
2. Safety device according to claim 1, in which the intermediate shaft is provided with a crank whose peg engages with a fork of the safety button and which gradu- ally swings out of the fork during release of the safety button.

3. Safety device according to claim 1, in which the safety button and the operating lever in their basic position lie in a common plane.

4. Safety device according to claim 1, in which the safety button is mounted loosely on said axis and is coupled with the operating lever with interposition of a backlash which corresponds to the shifted path of the operating rod required for securing or release of the lock.

5. Safety device according to claim 1, in which the safety button is mounted loosely on said axis and is coupled with the operating lever with interposition of a backlash which corresponds to the shifted path of the operating rod required for securing or release of the lock, the backlash of the safety button being fixed by a driver arranged on a hub of the operating lever and engaging in a segment-like recess on the hub of the safety button.

References Cited
UNITED STATES PATENTS

| | | | |
|---|---|---|---|
| 391,384 | 10/1888 | Osborne | 292—210 |
| 2,268,904 | 1/1942 | Schallis | 292—1 |
| 2,742,314 | 4/1956 | Santos | 292—336.3 |
| 2,872,235 | 2/1959 | Brueder | 292—336.3 |
| 3,391,956 | 7/1968 | Rolfe | 292—210 |

JAMES A. LEPPINK, Primary Examiner

E. J. McCARTHY, Assistant Examiner

U.S. Cl. X.R.

292—153